Inventor
Wilbert B. McCluer
By Hugo A. Kemman
Attorney

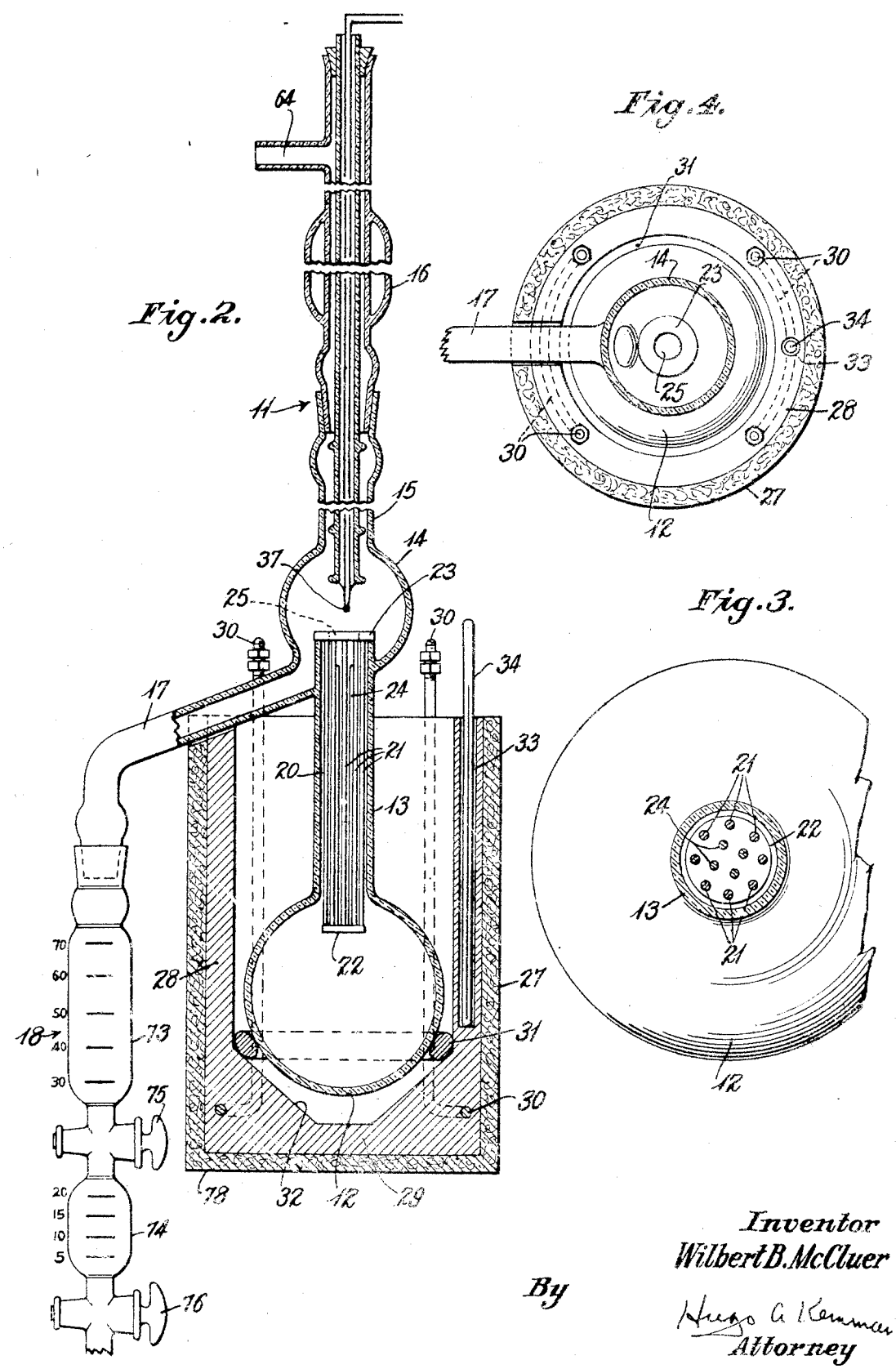

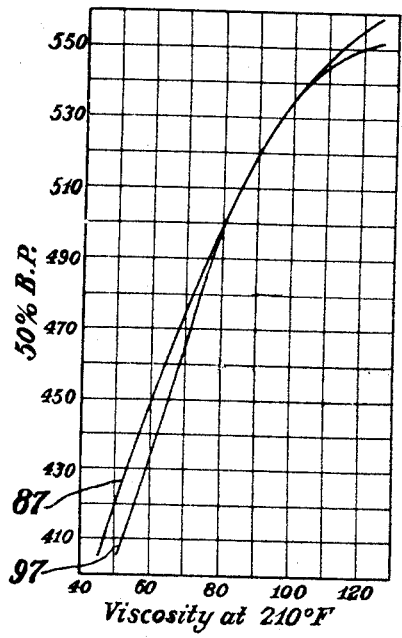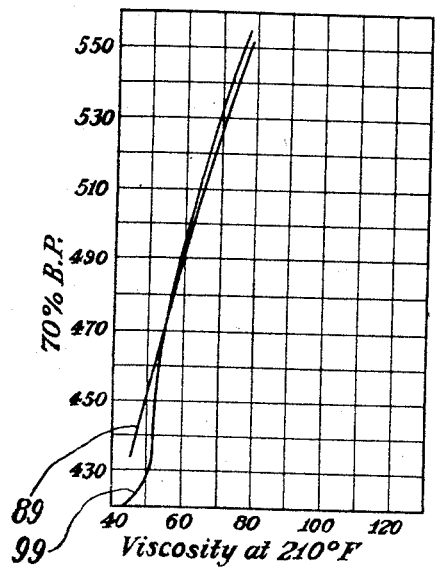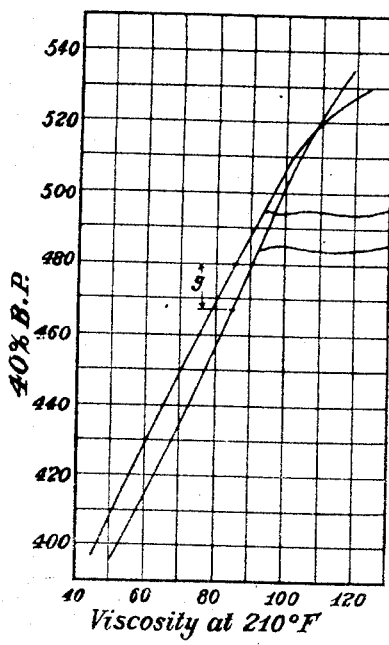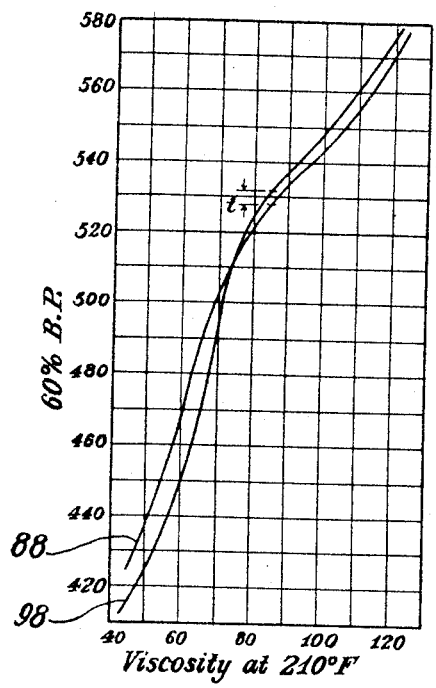

Patented May 3, 1938

2,116,442

UNITED STATES PATENT OFFICE 2,116,442

TESTING OF LUBRICATING OILS

Wilbert B. McCluer, State College, Pa., assignor to Pennsylvania Petroleum Research Corporation, a corporation of Pennsylvania Application September 14, 1933, Serial No. 689,470
Renewed July 16, 1937

3 Claims. (Cl. 196—77)

This invention pertains generally to the testing of liquid materials and pertains particularly to the testing of lubricating oils. It will be described in connection with the detection and quantitative determination of relatively low boiling constituents in blended and long residuum lubricating oils. However, it is to be understood that it may have other uses.

By the term a blended oil is meant an oil which has desired properties such as viscosity as a result of the mixing of desired amounts of two or more oils of different viscosities. Blended Pennsylvania lubricating oils, for instance, are generally made up by blending a neutral and a bright stock, and the viscosity of the finished oil is determined by the percentages of neutral and bright stock present therein. By the term long residuum oil is meant an oil whose viscosity is determined by the percentage of residuum which is left after the lighter constituents such as gasoline, kerosene, gas oil, etc., are taken off from the crude.

There is a certain feeling in the industry that a lubricating oil should not have constituents which boil below certain more or less well defined limits.

However, since scarcely anything is known of the chemical and physical characteristics of the individual compounds which make up a lubricating oil, it has heretofore been extremely difficult to detect the presence of low boiling constituents and to quantitatively determine the amounts thereof.

It will, of course, be appreciated that a finished oil of given viscosity characteristics may vary widely as to the boiling points, viscosities and percentages of its constituents, depending first upon whether the base is asphaltic, mixed or paraffinic, and second upon the boiling point spread of the finished oil. Therefore, the yardsticks heretofore employed such as viscosity index, viscosity-gravity constant, gravity index etc., although very helpful, have not afforded a complete measure of the fitness of a lubricating oil.

To make the available yardsticks more complete, a feature of this invention pertains to the detection and/or quantitative determination of certain constituents in lubricating oils which are undesirable because of their lower boiling point.

A further feature of this invention pertains to a process for quickly and easily detecting and/or quantitatively determining such undesirable constituents.

A further feature of this invention pertains to new and novel apparatus for the purposes above set forth.

Further features of the invention reside in the construction, arrangement and combination of parts, and in the steps, combinations and sequences of steps, all of which together with further features will become more apparent to persons skilled in the art as the specification proceeds and upon reference to the drawings, in which like reference characters have been appended to like parts in the various figures, and in which:

Figure 2 is an enlarged view of the flask and receiver shown in Figure 1.

Figure 3 is a section on line 3—3 of Figure 1.

Figure 4 is a section on line 4—4 of Figure 1.

Figure 1:
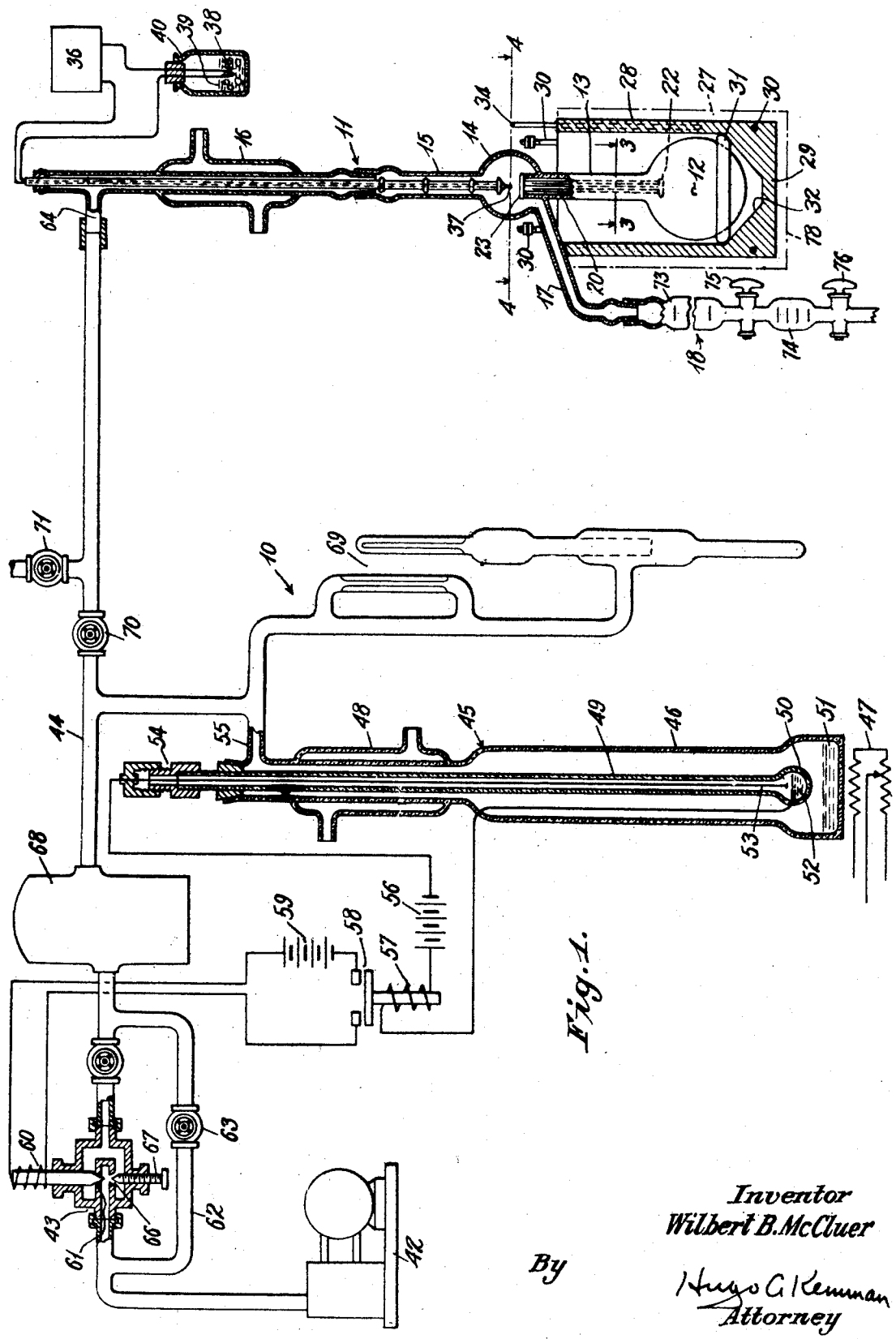
Figure 1 is a semi-diagrammatic illustration, partly in section, of apparatus for carrying out the invention.
Figure 8:
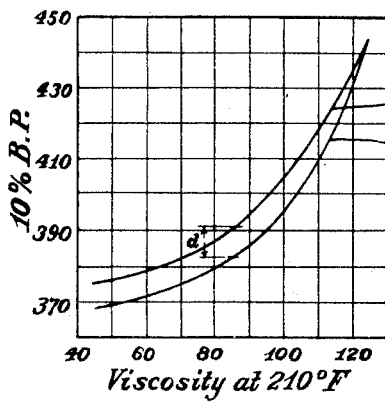

Figures 6 to 14 inclusive are each graphs in which the initial 5%, 10%, 20%, 30%, 40%, 50%, 60% and 70% boiling points respectively of the two series of reference oils are plotted against the viscosities at 210° F. of the respective series of reference oils.

In any procedure for the detection and quantitative determination of undesired constituents of a substance it is of course necessary that the results may be reproduced as many times as desired. All possible variables should be reduced to a minimum. When fractionation is involved the same character of reflux should be provided, the total pressure should be the same, the apparatus should have a standard size, the same adiabatic characteristics should obtain in the column, the same quantity of material should be tested, and the source of heat, quantities of heat, and rate of heating should be standardized.

As a general rule, it may be said that the higher the boiling point of a lubricating oil of a given viscosity rating, the more difficult it will be to distill it without cracking some of its constituents.

Cracking is not only a function of temperature but also of time.

By resorting to an extremely low total pressure, a very high vapor velocity, using only a relatively small quantity of oil in the charge, providing a standardized reflux which varies automatically from substantially infinity to substantially zero as the distillation proceeds, and avoiding superheating of the vapors it is found that reliable results may be obtained.

Referring now more particularly to the drawings, at 10 is shown means for obtaining relatively low absolute pressures and at 11 a distilling flask.

Flask 11 comprises a bulb portion 12, a stem 13, a product take-off bulb 14, a second stem 15, and a condenser 16. A product line 17 leads from product take-off 14 to a graduated receiver 18.

Stem 13 projects up into bulb 14 for a short distance thus affording separating means for the upflowing vapors and the downflowing condensed product.

Bulb 12, stem 13, bulb 14, stem 15, condenser 16 and product line 17 may be of any suitable size, construction, and material, but in order that the results may be reproduced and in order that the graphs hereinafter to be described may become standardized it is preferred that the size, construction, and material be standardized.

Stem 13 houses a device 20 (which is preferably also standardized) for automatically varying the reflux ratio from substantially infinity to substantially zero as the distillation proceeds. Device 20 may assume a great variety of forms. As illustrated, device 20 comprises a plurality of spaced metallic rods 21 joined at the bottom and top by plates 22 and 23 respectively, and a plurality of spaced inner rods 24 which are joined to lower plate 22. Rods 21 may be of iron or of any other metallic or other substance of desired specific heat. In order to afford a substantially equal distribution of vapors through device 20, rods 21 have been made to project down into bulb 12 for a short distance, plate 22 has been made imperforate, and plate 23 has an opening 26 at its center for the upward flow of the vapors. It will be noted that rods 24 stop short of plate 23 so as to afford free access of vapors to opening 26 and that the entire device 20 is constructed so as to create only a very small pressure drop. The latter is also true of bulb 14, stem 15 and condenser 16. Very high vapor velocities are thus provided for.

Plate 23 is of a sufficiently large diameter to rest upon the upper end of stem 13. A support for device 20 is thus provided.

A heater 27 is adapted to enclose bulb 12 and a substantial portion of the stem 13. Heater 27 comprises a cylindrical shell 28 (which may be of aluminum) closed at one end 29, and having embedded therein electrical heating means illustrated at 30. A gasket 31 is shown adjacent the closed end 29 and acts as a cushion for bulb 12. The inner surface 32 of end 29 is shown shaped somewhat conically or semi-spherically for better heat conductivity to the bulb 12. The stem 13 is of lesser diameter than bulb 12 and there is therefore considerably more spacing between it and the shell 28.

A recess 33 may be provided in shell 28 to house a thermometer 34. The purpose of the heater construction particularly described is to bring the oil in bulb 12 to a boiling temperature and to maintain it at a boiling temperature without superheating such as would be caused for instance by a direct flame, electric grid or other similar device which causes a relatively high heat gradient between the source of heat and the oil. With the construction shown the heat gradient may be relatively low and may be very closely controlled. The oil is heated more or less uniformly over a very substantial area and superheating of the vapors may thus be materially reduced or eliminated. Because of the greater spacing between stem 13 and shell 28 no substantial heat transfer takes place therebetween. This is the function of this portion of the construction since it is preferred to heat insulate the stem 13 so that substantially no condensation takes place therein due to outside influences.

Any suitable means may be provided to measure the temperature of the vapors. As illustrated this means comprises a pyrometer 36 having its hot junction or junctions 37 positioned in the path of the vapors directly above opening 26 in plate 23, and its cold junction or junctions 38 placed in an ice bath 39 in container 40. Since the construction and operation of pyrometers are well known in the art a detailed description thereof will not be given.

The means shown at 10 for obtaining closely controlled relatively low absolute pressures is particularly described and claimed in copending application Serial No. 688,415 by Merrell R. Fenske filed September 6, 1933. Briefly, this comprises a vacuum pump 42, an electrically operated valve 43, a low pressure line 44 and a valve control mechanism 45. The control mechanism 45 comprises a flask 46 provided at its bottom with heating means 47 and at its top with condensing means 48. A temperature controlled switch 49 is positioned in flask 46 with its reactive portion 50 shown positioned directly above liquid 51 in flask 46. The particular switch 49 illustrated is of the thermometer type and has an expansible liquid 52 such as mercury and an adjustable contact 53 which may be adjusted to and from liquid 52 by means illustrated at 54 thus making adjustable the temperature at which switch 49 opens and closes. The construction is such that flask 46 is airtight and by connecting the flask 46 to vacuum line 44 as illustrated at 55 the absolute pressure in flask 46 is made to follow that of line 44.

Switch 49 controls a circuit through battery 56 and control element 57 of relay 58. Relay 58 controls a circuit through battery 59 and valve control element 60 of valve 43. Control element 60 opens and closes an orifice 61 in valve 43.

As illustrated switch 49 is open, relay 58 is open and orifice 61 is closed.

When the device 10 is in operation liquid 51 is maintained at a boil by the heating means 47. The temperature of the vapors from liquid 51 will, of course, depend upon the absolute pressure in flask 46 and consequently in line 44. If the absolute pressure becomes higher than is desired switch 49 will close. This will close relay 58 and thus close the circuit through control element 60. This results in the opening of orifice 61. Line 44 is now connected to pump 42 through orifice 61. In the particular construction illustrated, pump 42 is maintained in continuous operation.

When the desired absolute pressure in line 44 and flask 46 is restored the temperature of the vapors from liquid 51 will have fallen sufficiently to cause switch 49 to open. This opens relay 58 and thus the circuit through control element 60 whereupon orifice 61 is closed.

When the absolute pressure again rises above the desired value the cycle is repeated.

Condenser 48 preferably condenses all of the vapors of liquid 51 so that none of the vapors of liquid 51 escape.

Liquid 51 may be of any suitable character whether a single compound or a mixture of compounds and while a constant boiling and stable compound or mixture is to be preferred other may be employed.

For very close control work superheating of the vapors should be avoided as much as possible. This may be accomplished in a measure at least by having liquid 51 of relatively low specific gravity and of relatively low height in flask 46.

Diphenyl methane is found to be very suitable as a liquid.

Line 44 is shown connected to distilling flask 11 at 64.

In order to afford a rapid initial evacuation of distilling flask 11 a bypass 62 may be provided around valve 43. Bypass 62 is shown with a valve 63 for control purposes. Valve 63 is closed when the absolute pressure begins to approach the proper value.

In order to avoid any surges which may be caused by the opening and closing of orifice 61, a second fixed orifice 66 may be provided in valve 43. Orifice 66 is shown as having an adjustment 67. When orifice 66 is employed its opening is set at some desired point below the demands of the system. The rest of the evacuation required from time to time to hold the absolute pressure constant is supplied by the opening at the proper times of orifice 61 by the control mechanism 45.

Surges may also be evened out by the use of a surge tank illustrated at 68.

In order that the absolute pressure may be checked visually and also to afford means for guiding the adjustment of contact 53 a vacuum gauge 69 may be provided.

Valve 70 is a shut-off valve to hold the vacuum in line 44 when flask 11 is to be disconnected, and valve 71 is a vacuum release valve to release the vacuum in flask 11.

Receiver 18 is shown in full in Figure 2, and may be of the ordinary graduated type. The particular receiver illustrated has an upper compartment 73 and a lower compartment 74 separated by a valve 75. A second valve 76 is provided for draining compartment 74. The graduations are in percentages of the volume of the oil originally charged into bulb 12. The arrangement is such that compartment 74 is allowed to fill first up to the 20% graduation whereupon valve 75 is closed. Then compartment 73 is permitted to fill. By following this procedure the percentage of oil distilled at any moment may be read directly on the graduations. The particular graduations fit into the solution of a specific problem to be hereinafter particularly set forth.

Shell 28 of heater 29 may be provided over its outside with lagging 78 for heat insulation purposes if desired.

In operation a suitable portion of the oil to be tested is charged into bulb 12. It is found that 50 cubic centimeters of the oil is quite ample and this will therefore be adopted as an example. After charging the oil the parts are assembled and flask 11 is connected to line 44. Any suitable means may be provided for supporting the parts and for facilitating assembly and disassembly. Heating elements 30 are then connected to any suitable electrical source, preferably through a current control (not shown) so that the temperature of shell 28 may be closely controlled. Thermometer 34 will assist in controlling the temperature of shell 28. Valve 76 is closed and valve 75 is opened.

The oil is brought to and maintained at a boil. Since the device 20 is cold the first vapors to be produced are substantially completely refluxed. As device 20 begins to warm up a part of the vapors begin to escape up into stem 15 and condenser 16 as product. These vapors are thoroughly scrubbed by the reflux caused by the device 20. The condensate is collected in compartment 74. The heat absorbed from the vapors by the device 20 materially reduces or eliminates superheat in the vapors.

The purpose of the high reflux ratio at the start is to thoroughly rectify the vapors of the lighter constituents of the oil, since a representative quantity of the lighter constituents such as 20% is to be subjected to special tests such as viscosity measurements.

As the distillation proceeds device 20 begins to warm up, but since it is necessary to continually raise the temperature of the oil to maintain it at boiling the temperature of device 20 will lag behind the temperature of the vapors to an extent dependent upon its specific heat and mass (which is preferably standardized) and will cause a moderate amount of reflux.

The total pressure is preferably very low, that is of the order of 1 millimeter of mercury and is preferably maintained constant. With the device disclosed at 10 it is possible to hold the total pressure constant within at least 3 percent at a pressure of 1 millimeter of mercury.

Because of the very low absolute pressure and therefore the extreme diluteness of the vapors, a very high vapor velocity has been provided for in flask 11. Practically no obstruction exists in the path of the vapors between bulb 12 and condenser 16. This affords a finite rate of condensation and a material reduction or elimination of superheat because of the relatively low pressure drop. The whole distillation may be accomplished in a relatively short time.

The very low total pressure, the avoidance of superheating, and the rapidity of the distillation makes it possible to distill over very high percentages of the oil without cracking. For instance, lubricating oils having viscosities of the order of 125 Saybolt seconds at 210° F. may be readily distilled up to 60%.

In the procedure to be particularly described the distillate is first collected in compartment 74 until 20% of the original oil has been distilled. Valve 75 is then closed and the rest of the distillate is collected in compartment 73.

During the distillation the initial, 5%, 10%, 20%, 30%, 40%, 50%, 60%, and 70% boiling points are noted.

Let us assume that the first 20% oil sample has been collected and segregated and the boiling points above set forth have been noted. The question now arises as to how this information is to be used.

In evaluating the fitness of a lubricating oil it is very helpful to compare it with a reference oil of recognized suitability. As an example, let us take the blended oils of Pennsylvania grade. As previously set forth, these oils are generally made up from various percentages of a filtered neutral and of a bright stock, the percentages of each depending upon the viscosity desired in the finished oil. Since the neutral is the more volatile of the two constituents minimum specifications for neutrals used in blending may be made. Minimum specifications may also be made for bright stocks to be used in blending.

Let us assume that a series of finished oils are made up by blending a neutral of minimum specifications and a bright stock of minimum specifications and that these finished oils vary in viscosity at 210° F. all the way from 50 seconds Saybolt to 125 seconds Saybolt. These blended oils may be regarded as representing the minimum requirements for lubricating oils regardless of whether they are of the blended, long residuum, or other type. By making a run on each of these blended oils, reference data may be obtained for a finished oil of any viscosity at 210° F. between 50 and 125 seconds Saybolt.

Figure 5:
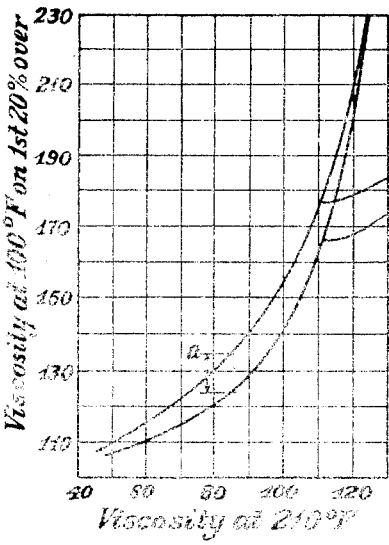
Figure 5 is a graph in which the viscosities at 100° F. of the first 20% of two different series of reference oils are plotted against the viscosities at 210° F. of the respective series of reference oils.
Figure 10:
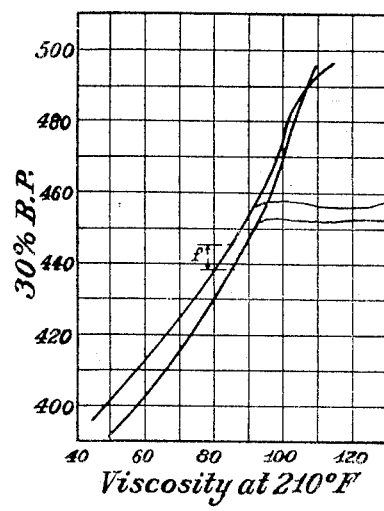
Figure 9:
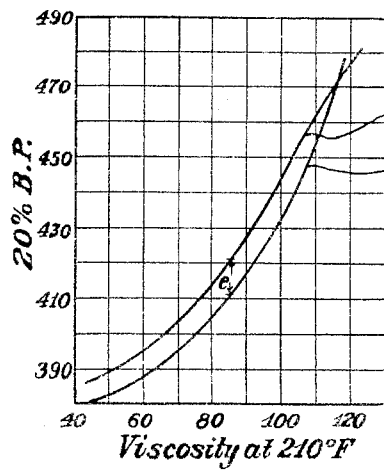

The viscosities at 100° F. of the first 20% specimens of the blended reference oils may then be plotted against the viscosities in Saybolt seconds of the original reference oils at 210° F. Such a curve is shown at 80 in Figure 5.

The initial boiling points of the blended reference oils may also be plotted against the viscosities in Saybolt seconds of the original reference oils at 210° F. Such a curve is shown at 81 in Figure 6.

The 5%, 10%, 20%, 30%, 40%, 50%, 60%, and 70% boiling points respectively of the blended reference oils may also be plotted against the viscosities in Saybolt seconds of the original reference oils. Such curves are shown at 82, 83, 84, 85, 86, 87, 88, and 89 in Figures 7, 8, 9, 10, 11, 12, 13, and 14 respectively.

Now let us assume that a series of finished oils are made up by using a neutral which falls somewhat below the minimum specifications and a bright stock of minimum specifications, and that a run is made on each oil. Similar curves may then be plotted in each of Figures 5 to 14 for these oils. Such curves are shown at 90, 91, 92, 93, 94, 95, 96, 97, 98, and 99 in Figures 5 to 14 respectively.

In using the graphs of Figures 5 to 14 the upper curve is to be considered as the base line and the vertical distance between the two curves on any graph on any ordinate thereof is to be considered as one unit with the upper curve having an absolute rating of zero.

In testing an oil to see if it meets specifications the initial, 5%, 10%, 20%, 30%, 40%, 50%, 60%, and if possible the 70% boiling points are taken, and the viscosity at 100° F. of the first 20% specimen is taken. The viscosity of the original oil in Saybolt seconds at 210° F. is also measured. If we assume that the latter viscosity is 85, for instance, we find upon reference to Figure 5 that to meet specifications the viscosity in Saybolt seconds at 100° F. of the first 20% specimen should be at least 135. On the ordinate representing 85 Saybolt seconds the vertical distance "a" between the two curves, 80 and 90 is equal to 11 units or the equivalent of 11 Saybolt seconds.

Therefore, if the viscosity at 100° F. of the first 20% specimen is 135 Saybolt seconds, the reading will be zero. If the viscosity is 124 the reading will be −1. If it is 113 the reading will be −2. If it is 146 the reading will be +1. If it is 157 the reading will be +2.0, etc.

Figure 6:
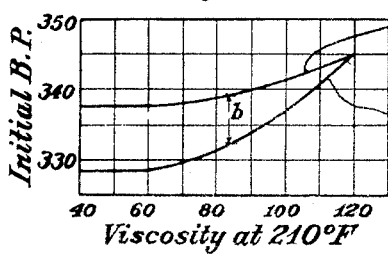

Passing on to Figure 6, I find that the vertical distance "b" on ordinate 85 between curves 81 and 91 is the equivalent of 6.5 degrees F., and that to be normal the initial boiling point of the oil should be at least 339° F.

Therefore, if the initial boiling point of the oil is 339° F. the reading is zero. If it is 332.5° F. the reading is −1.0. If it is 345.5° F. the reading is +1.0, etc.

Figure 7:
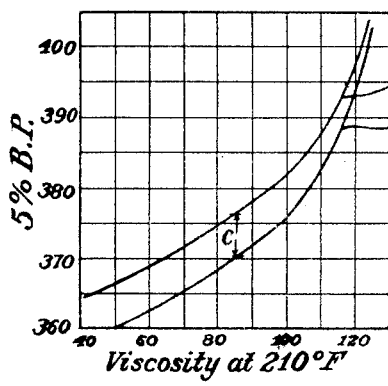

Passing on to Figure 7 I find that curve 82 intersects ordinate 85 at 376.5, and that curve 92 intersects ordinate 85 at 370, making the vertical distance "c" on ordinate 85 between the two curves the equivalent of 6.5 degrees F. Readings for the 5% boiling point are taken on Figure 7 in the same manner as readings for the initial boiling point are taken on Figure 6.

In Figures 8, 9, 10, 11, 12, and 13 the distance between the intersections of the two curves in each figure with the ordinate 85 of the figure is the equivalent of 8, 10, 7, 13, 0, and 2 degrees F. respectively. The curves in Figure 14 do not reach ordinate 85.

Readings are taken on the graphs of Figures 8 to 13 in the same way that readings for the initial boiling point are taken in Figure 6. The above readings on all of the graphs are merely approximate since for the purpose of clarity all of the usual lines appearing on graph paper have not been reproduced.

When finished I have readings which may look something like the following:

| Oil | Vis. at 210° F. | Vis. 1st 20% | Initial | 5% B. P. | 10% B. P. | 20% B. P. | 30% B. P. | 40% B. P. | 50% B. P. | 60% B. P. | 70% B. P. |
|---|---|---|---|---|---|---|---|---|---|---|---|
| #1 | 85 | −0.5 | −0.5 | −0.3 | 0 | 0.2 | 0.25 | 1 | Above curves | 1.1 |  |

The readings afford a means for comparing the tested oil with an approved reference oil. In the foregoing a test oil of 85 vis. at 210° F. is compared with a reference oil of 85 vis. at 210° F. and the readings show how the two oils compare.

For instance, I find that the above tested oil is below standard on "vis. of 1st 20%", on "initial" and on "5% B. P." but that it is above standard on "20% B. P.", "30% B. P.", "40% B. P.", and "60% B. P.". The two curves coincide in Figure 12 and therefore no reading can be taken. A note however would be made of the fact that the "50% B. P." is above the coinciding curves and weight would be given to this fact in cases of doubt.

The readings form a basis of comparison, that is, a means for evaluating differences between the tested oil and the reference oil. Whether the tested oil is to be accepted or rejected is a matter of policy for the individual, company, firm, association or other organization using the invention.

Adding the readings algebraically up to and including that for "50% B. P." and using the "60% B. P." and "70% B. P." readings when taken as checks appears to be a fair means for passing upon lubricating oils. If the sum is zero or a plus quantity the oil may be accepted. If the sum is a minus quantity the oil should be rejected. A limit may also be placed on any minus reading say, for instance, −2.

Applying this system to oil #1 above I find upon algebraic addition that the sum is plus .15 and that no reading is below minus 2. The oil, therefore, may be passed without the necessity of giving weight to the fact that the two curves coincide in Figure 12 at ordinate 85, and that the "50% B. P." is above the coinciding curves in the above readings. The following are typical readings resulting from actual tests.

| Oil | Vis. 210 | Vis. 1st 20% | Initial | 5% B.P. | 10% B.P. | 20% B.P. | 30% B.P. | 40% B.P. | 50% B.P. | 60% B.P. | 70% B.P. | Conclusion |
|---|---|---|---|---|---|---|---|---|---|---|---|---|
| #2 | 60 | -2.6 | -------- | -3.2 | -4.5 | -2.7 | -2.0 | -1.4 | -1.4 | -1.4 | -------- | Rejected. |
| #3 | 60.4 | -2.0 | -------- | 1.7 | 1.5 | 1.6 | 1.6 | 1.15 | .63 | .47 | -------- | Accepted. |
| #4 | 65 | -4.1 | -------- | -3.0 | -4.0 | -1.0 | .3 | .3 | 1.2 | .7 | -------- | Rejected. |
| #5 | 62.4 | 7.0 | -------- | 2.8 | 5.0 | 2.1 | 1.1 | 0 | -1.1 | -2.0 | -------- | Accepted. |

Both sets of reference oils are preferably though not necessarily of the same base crude.

The above examples afford an illustration of how the invention may be applied. It will, of course, be obvious that any desired specifications may be set up and that the invention may be employed to determine whether a certain oil meets such specifications.

Although the invention has been particularly described in connection with the testing of lubricating oils, it is to be understood that it may be applied to any mineral oil or in fact to any substance that will lend itself to this manner of testing. In the latter connection it should be noted that high boiling substances which tend to decompose with heat may be tested by the invention, since the very low absolute pressure afforded by the device 10 makes it possible to distill such substances at relatively low temperatures.

Since the change in temperature of the vapors of the liquid in flask 46 for the same percentage change in absolute pressure increases as the absolute pressure decreases the device 10 is extremely accurate for all pressures including very low pressures. Therefore, although absolute pressures of the order of 1 millimeter have been referred to as being applicable to the particular problem set forth, it is possible to use much lower absolute pressures. The limit in low absolute pressures is determined only by the ability of the art to construct suitable evacuating apparatus, such as a vacuum pump, which will lend itself to control by the device set forth herein.

It is hardly necessary to mention that the device 10 is also adapted to control any pressure above 1 millimeter of mercury whether it is below or above atmospheric.

In the foregoing examples the temperature has been measured while the pressure has been held constant. It is also possible to measure the temperature while the pressure is being varied. The latter would be particularly useful in plotting pressure-temperature diagrams of constant boiling substances. Heretofore it has been the custom to vary the temperature and measure the pressure in constructing such diagrams. The extremely accurate absolute pressure control afforded by the device 10 makes it possible to construct such a diagram by varying the pressure and measuring the temperature.

Other uses will suggest themselves to persons skilled in the art after becoming familiar with this invention.

Having described the invention it will be obvious that changes, omissions, additions, substitutions and modifications, other than those specifically mentioned, may be made without departing from the spirit thereof. The claims, therefore, are intended to be limited only as required by the prior art.

I claim:

1. A process for testing a lubricating oil comprising subjecting a small standardized quantity of said oil to a low and constant standardized absolute pressure while subjecting said oil to uniform and standardized heating conditions sufficient to cause vaporization, said quantity of oil being such that when taken in conjunction with said pressure vaporization of the larger part of said oil takes place without any substantial decomposition, subjecting the resulting vapors to a standardized reflux under conditions avoiding any substantial cooling of said reflux below its boiling point and also avoiding superheating of said vapors, the reflux ratio being automatically varied from approximately infinity to approximately zero as the distillation proceeds by contacting said vapors with a metallic element of substantial and standardized mass, measuring the temperature of the rectified vapors as successive predetermined quantities of oil are distilled over, and comparing the data thus obtained with similar data obtained under identical conditions with standard reference oils.

2. A process for testing a lubricating oil comprising subjecting a small standardized quantity of said oil to a low and constant standardized absolute pressure while subjecting said oil to uniform and standardized heating conditions sufficient to cause vaporization, said quantity of oil being such that when taken in conjunction with said pressure vaporization of the larger part of said oil takes place without any substantial decomposition, subjecting the resulting vapors to a standardized reflux under conditions avoiding any substantial cooling of said reflux below its boiling point and also avoiding superheating of said vapors, the reflux ratio being automatically varied from approximately infinity to approximately zero as the distillation proceeds by contacting said vapors with a metallic element of substantial and standardized mass, measuring the temperature of the rectified vapors as successive predetermined quantities of oil are distilled over, making an initial cut of standardized size, measuring the viscosity at a predetermined temperature of said cut, and comparing all data thus obtained with similar data obtained under identical conditions with standard reference oils.

3. A process for testing a lubricating oil comprising subjecting said oil to a low absolute pressure while subjecting said oil to uniform heating conditions sufficient to cause vaporization, the quantity of oil and the pressure being such that vaporization of the larger part of said oil takes place without any substantial decomposition, subjecting the resulting vapors to a standardized reflux under conditions avoiding any substantial cooling of said reflux below its boiling point and also avoiding superheating of said vapors, the reflux ratio being automatically varied by contacting said vapors with a metallic element of substantial and standardized mass, measuring the temperature of the rectified vapors as successive predetermined quantities of oil are distilled over, and comparing the data thus obtained with similar data obtained under identical conditions with standard reference oils.

WILBERT B. McCLUER.